US009179269B2

(12) United States Patent
Lee et al.

(10) Patent No.: US 9,179,269 B2
(45) Date of Patent: Nov. 3, 2015

(54) METHOD AND APPARATUS FOR TRANSMITTING SYNCHRONIZATION SIGNAL IN TALK-AROUND DIRECT COMMUNICATION NETWORK

(71) Applicant: Electronics and Telecommunications Research Institute, Daejeon (KR)

(72) Inventors: Hyun Lee, Daejeon (KR); Mi Young Yun, Daejeon (KR); Seok Ki Kim, Gyeonggi-do (KR); Won-Ik Kim, Daejeon (KR); Chul Sik Yoon, Daejeon (KR); Sung Cheol Chang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 232 days.

(21) Appl. No.: 14/025,305

(22) Filed: Sep. 12, 2013

(65) Prior Publication Data
US 2014/0073372 A1    Mar. 13, 2014

(30) Foreign Application Priority Data

Sep. 12, 2012  (KR) ........................ 10-2012-0100996
Sep. 10, 2013  (KR) ........................ 10-2013-0108717

(51) Int. Cl.
*H04B 7/00*    (2006.01)
*H04W 4/10*    (2009.01)
*H04W 74/08*   (2009.01)
*H04W 56/00*   (2009.01)

(52) U.S. Cl.
CPC .............. *H04W 4/10* (2013.01); *H04W 56/005* (2013.01); *H04W 74/0841* (2013.01)

(58) Field of Classification Search
CPC ... H04W 56/001; H04W 4/10; H04W 56/005; H04W 74/0841
See application file for complete search history.

(56) References Cited

U.S. PATENT DOCUMENTS

| | | | |
|---|---|---|---|
| 2002/0028689 A1* | 3/2002 | Iwami et al. ................... | 455/502 |
| 2007/0165550 A1* | 7/2007 | Kang ............................ | 370/294 |
| 2010/0027603 A1* | 2/2010 | Beadle et al. ................. | 375/226 |
| 2011/0134789 A1* | 6/2011 | Nagai et al. ................... | 370/252 |
| 2012/0163278 A1  | 6/2012 | Chang et al. | |
| 2014/0056192 A1* | 2/2014 | Meylan et al. ................ | 370/311 |

FOREIGN PATENT DOCUMENTS

KR    10-2012-0073147 A    7/2012

* cited by examiner

*Primary Examiner* — Edward Urban
*Assistant Examiner* — Mohammed Rachedine
(74) *Attorney, Agent, or Firm* — Rabin & Berdo, P.C.

(57) ABSTRACT

A method and apparatus for transmitting a synchronization signal in a talk-around direct communication network is provided. The method includes: determining one of a plurality of second windows included in a first window as a synchronization reception window; selecting one of a plurality of synchronization slots included in the second windows as a first synchronization slot; transmitting a first synchronization signal through the first synchronization slot included in the second windows, excluding the synchronization reception window; detecting a second synchronization signal transmitted from other terminals using the first synchronization slot included in the synchronization reception window; and determining that a collision from amongst the synchronization signals has occurred based on the detection result.

18 Claims, 12 Drawing Sheets

METHOD AND APPARATUS FOR TRANSMITTING SYNCHRONIZATION SIGNAL IN TALK-AROUND DIRECT COMMUNICATION NETWORK

CROSS-REFERENCE TO RELATED APPLICATION

This application claims priority to and the benefit of Korean Patent Application Nos. 10-2012-0100996 and 10-2013-0108717 filed in the Korean Intellectual Property Office on Sep. 12, 2012 and Sep. 10, 2013, the entire contents of which are incorporated herein by reference.

BACKGROUND OF THE INVENTION (a) Field of the Invention

The present invention relates to a method and apparatus for transmitting a synchronization signal in a talk-around direct communication network.

(b) Description of the Related Art

Some schemes to avoid a collision between synchronization signals from terminals in a talk-around direct communication (TDC) network have recently been suggested. Among these, a scheme that transmits a synchronization signal by using a vacant slot has not been able to prevent synchronization signals from colliding.

If the collision problem between synchronization signals is not resolved, synchronization between terminals cannot be maintained and the performance of communication service may deteriorate.

SUMMARY OF THE INVENTION

The present invention has been made in an effort to provide a method and apparatus for transmitting synchronization signal that prevent the synchronization signal from colliding by detecting a collision between synchronization signals in a TDC network.

An exemplary embodiment of the present invention provides a method for transmitting a synchronization signal of a terminal in a talk-around direct communication network. The method includes: determining one of a plurality of second windows included in a first window as a synchronization reception window; selecting one of a plurality of synchronization slots included in the second windows as a first synchronization slot; transmitting a first synchronization signal through the first synchronization slot included in the second windows, excluding the synchronization reception window; detecting a second synchronization signal transmitted from other terminals using the first synchronization slot included in the synchronization reception window; and determining that a collision from amongst the synchronization signals has occurred based on the detection result.

The second window includes a plurality of superframes, and every superframe includes a synchronization slot.

The detecting includes comparing intensity of the second synchronization signal to a predetermined critical intensity.

The determining includes: determining that the collision has not occurred when the intensity of the second synchronization signal is lower than the predetermined critical intensity; and determining that the collision has occurred when the intensity of the second synchronization signal is higher than the predetermined critical intensity.

The method for transmitting synchronization signal of a terminal further including: after the determining, decoding a preamble and data of the second synchronization signal; and determining whether the terminal is a continuously transmitting terminal or not, based on priority information included in the decoded data of the second synchronization signal.

The method for transmitting a synchronization signal of a terminal further includes: selecting one of a plurality of synchronization slots included in the second window as a second synchronization slot; and transmitting a third synchronization signal through the second synchronization slot included in the second windows, excluding the synchronization reception window.

The transmitting the first synchronization signal includes transmitting the first synchronization signal a predetermined number of times more through the first synchronization slot.

The method for transmitting synchronization signal of a terminal further includes stopping transmitting the first synchronization signal when the terminal is not the continuously transmitting terminal.

Another exemplary embodiment of the present invention provides an apparatus for transmitting a synchronization signal in a talk-around direct communication network. The apparatus includes: a window selection part configured to determine one of a plurality of second windows included in a first window as a synchronization reception window; a slot selection part configured to select one of a plurality of synchronization slots included in the second windows as a first synchronization slot; a transmitting part configured to transmit a first synchronization signal through the first synchronization slot included in the second windows, excluding the synchronization reception window; a reception part configured to detect a second synchronization signal transmitted from other terminals using the first synchronization slot included in the synchronization reception window; and a collision checking part configured to determine that a collision from amongst the synchronization signals has occurred based on the detection result.

DETAILED DESCRIPTION OF THE EMBODIMENTS

Figure 1:
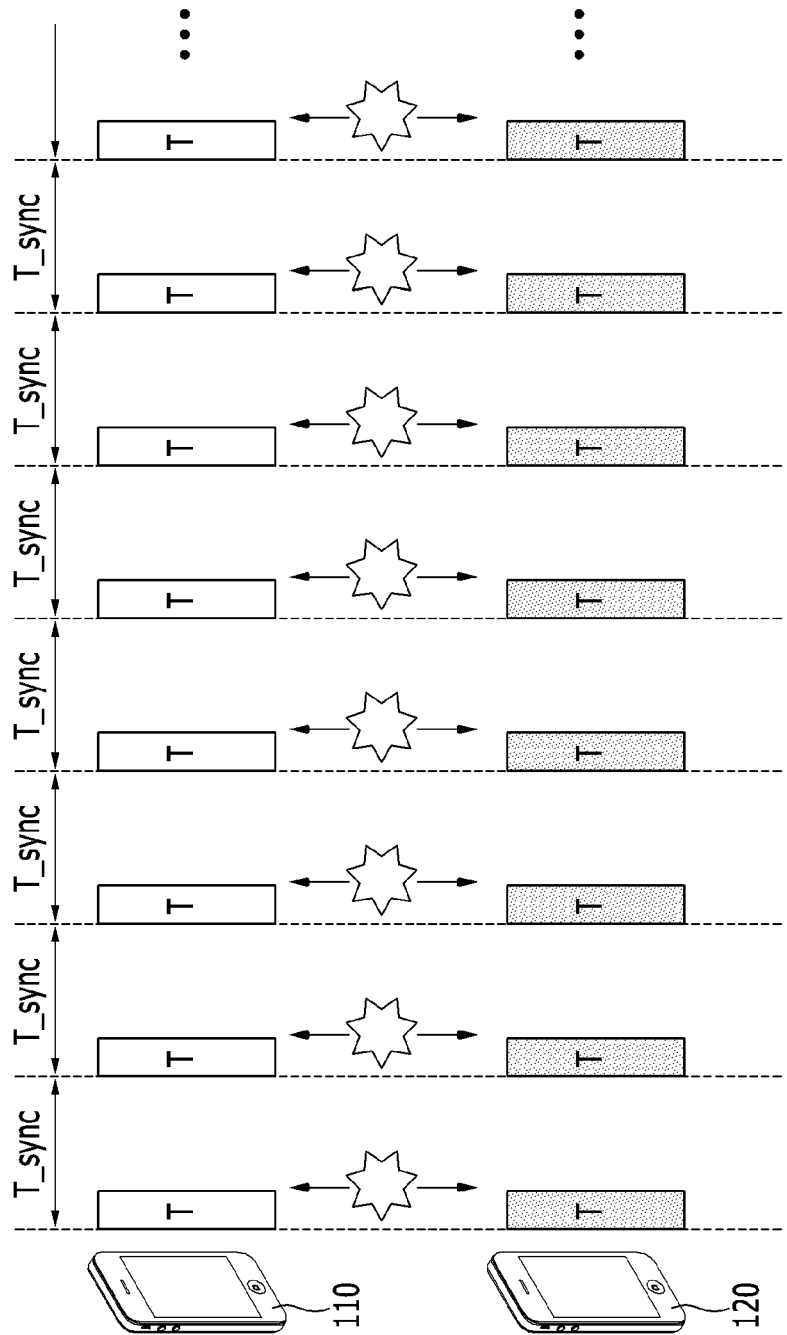
FIG. 1 is a diagram illustrating collision between synchronization signals from terminals in a TDC network.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements. Terms such as "unit", "module", "block", or the like described in the specification may refer to a unit for processing at least one function or operation, which can be implemented by hardware, software, or a combination of hardware and software.

FIG. 1 is a diagram illustrating a collision between synchronization signals from terminals in the TDC network.

Referring to FIG. 1, synchronization signals from terminals 110 and 120 collide because the terminals 110 and 120 use the same slot to transmit the synchronization signals. The terminal 110 and 120 may operate in accordance with IEEE 801.16.1a/D5.

In accordance with an exemplary embodiment of the present invention, terminals in the TDC network continuously receive synchronization channels and data only channels. Therefore, the terminals may know whether synchronization channels and data only channels are in use at a particular point in time. That is, the terminals may know some vacant synchronization slots at a particular point in time amongst the synchronization channels. The terminals in the TDC network should receive a synchronization slot in every frame, and synchronize the frames according to the method of reception synchronization.

The terminals in the TDC network may synchronize the frames according to the method of distributed synchronization to reduce interference in the TDC network.

Scenarios regarding distributed synchronization can be planned in the transmission synchronization and reception synchronization. The determination scenarios of reception synchronization refer to how a terminal can determine one of synchronization signals as a reference synchronization signal. Further, the determination and transmission scenarios of transmission synchronization refer to how a terminal generates a synchronization signal based on the reference synchronization signal and transmits the synchronization signal.

In accordance with an exemplary embodiment of the present invention, the terminals in the TDC network 1) may re-propagate the synchronization signals as widely as possible using minimum hops, and 2) may minimize the number of terminals transmitting synchronization information to avoid the collision between the synchronization signals. In the present invention, if the number of hops of re-propagated synchronization signals is identical, the synchronization signal which has the lowest reception intensity is selected and the terminal transmits the selected synchronization signal.

A terminal in the TDC network may determine synchronization signals according to the determination scenario of reception synchronization. The synchronization signals are divided into two types: a centralized transmission type and a local transmission type. The centralized transmission type includes a directly received base-station synchronization signal, a re-propagated base-station synchronization signal, a directly received global positioning system (GPS) synchronization signal, and a re-propagated GPS synchronization signal. The re-propagated GPS synchronization signal is not directly received from a global positioning system but is re-propagated from another terminal. The local transmission type includes a transmitted terminal synchronization signal and a re-propagated terminal synchronization signal. The propagation number of hops of the centralized transmitted synchronization signal (a directly received base-station synchronization signal or a directly received GPS synchronization signal) is "0". The propagation number of hops of the re-propagated synchronization signal (a re-propagated base-station synchronization signal or a re-propagated GPS synchronization signal) is augmented by "1" each time the synchronization signal is re-progated. The propagation number of hops of the local transmition type synchronization signal is augmented by "1" each time the number of hops is increased. In accordance with an exemplary embodiment of the present invention, the centralized transmitted synchronization signal has higher priority than the local transmitted synchronization signal.

First of all, a terminal in the TDC network determines whether directly received base-station synchronization signals are received. If directly received base-station synchronization signals are received, the terminal determines one of the synchronization signals that has most powerful reception intensity as a reference synchronization signal. Then, the terminal synchronizes the frame based on the determined reference synchronization signal.

If the directly received base-station synchronization signals are not received but the directly received GPS synchronization signals are received, the terminal determines one of the directly received GPS synchronization signals as a reference synchronization signal and synchronizes according to the determined reference synchronization signal.

If the directly received base-station synchronization signals and the directly received GPS synchronization signals are not received but re-propagated base-station synchronization signals or re-propagated GPS synchronization signals are received, the terminal compares the number of hops of the received synchronization signals. The terminal then selects one of the received synchronization signals that have the minimum number of hops. If only one re-propagated base-station (or GPS) synchronization signal is selected, the terminal determines the selected re-propagated base-station (or GPS) synchronization signal as a reference synchronization signal and synchronizes according to the determined reference synchronization signal. However, if a number of re-propagated base-station (or GPS) synchronization signals are selected, the terminal selects one of the received synchronization signals that has maximum reception intensity. Then, the terminal determines the selected re-propagated base-station (or GPS) synchronization signal as a reference synchronization signal and synchronizes according to the determined reference synchronization signal.

If there are only terminal type local synchronization signals, the terminal selects one of the received synchronization signals with the minimum number of hops that has maximum reception intensity. The terminal then determines the selected terminal type local synchronization signal as a reference synchronization signal and synchronizes according to the determined reference synchronization signal.

Finally, if received synchronization signals are not present, the terminal determines a terminal generated local synchronization signal as a reference synchronization signal and synchronizes according to the determined reference synchronization signal.

Subsequently, the terminal renews the reception synchronization according to the followed steps. First, the terminal continuously detects synchronization signals at every super frame. Then, when a synchronization signal that has higher priority than the reference synchronization signal is received a predetermined number of times within the predetermined period, the synchronization signal is determined as the new reference synchronization signal.

In the following description, the determination and transmission scenarios of transmission synchronization are presented. The case 1 in which the directly received base-station synchronization signals is a reference synchronization signal is described first.

First, the terminal determines whether re-propagated base-station synchronization signals whose number of hops is identical to the reference synchronization signal to be re-propagated are received. Through this invention, the reference synchronization signal to be re-propagated is generated based on the present reference synchronization signal of the terminal. Further, the number of hops of the reference synchronization signal to be re-propagated is greater than the number of hops of the present reference synchronization signal by "1". If re-propagated base-station synchronization signals whose number of hops is identical to the reference synchronization signal to be re-propagated are received, the terminal compares reception intensity of the re-propagated base-station synchronization signal to the reception intensity of the directly received base-station synchronization signals. In addition, the terminal determines the re-propagated base-station synchronization signal as a synchronization signal to be transmitted when the reception intensity of the directly received base-station synchronization signal has the lowest intensity among the compared signals. The terminal then transmits the synchronization signals when the reception intensity of the directly received base-station synchronization signal is lower than a predetermined intensity. The intensity of the received signal is determined based on the value of a reception intensity field value of the received synchronization signal.

The case 2 in which the directly received GPS synchronization signals is a reference synchronization signal will now be described. First, the terminal determines the directly received GPS synchronization signal as a synchronization signal to be transmitted when the reception intensity of the directly received GPS synchronization signal is lower than predetermined intensity. The terminal then transmits the synchronization signal to be transmitted.

The case 3 in which the re-propagated GPS synchronization signal is a reference synchronization signal will now be described. First, the terminal determines the re-propagated GPS synchronization signal as a synchronization signal to be transmitted when the reception intensity of the re-propagated GPS synchronization signal is lower than predetermined intensity. The terminal then transmits the synchronization signal to be transmitted.

Finally, the case 4 in which a self-generated local synchronization signal or a re-propagated local synchronization signal is a reference synchronization signal will be described. First, the terminal compares reception intensity of the re-propagated local synchronization signals whose number of hops is identical to the reference synchronization signal to be re-propagated to the reception intensity of the present reference synchronization signal. The terminal then determines a synchronization signal to be re-propagated as a synchronization signal to be transmitted when the reception intensity of the present reference synchronization signal has lowest intensity. The terminal then transmits the synchronization signal to be transmitted.

Figure 2:
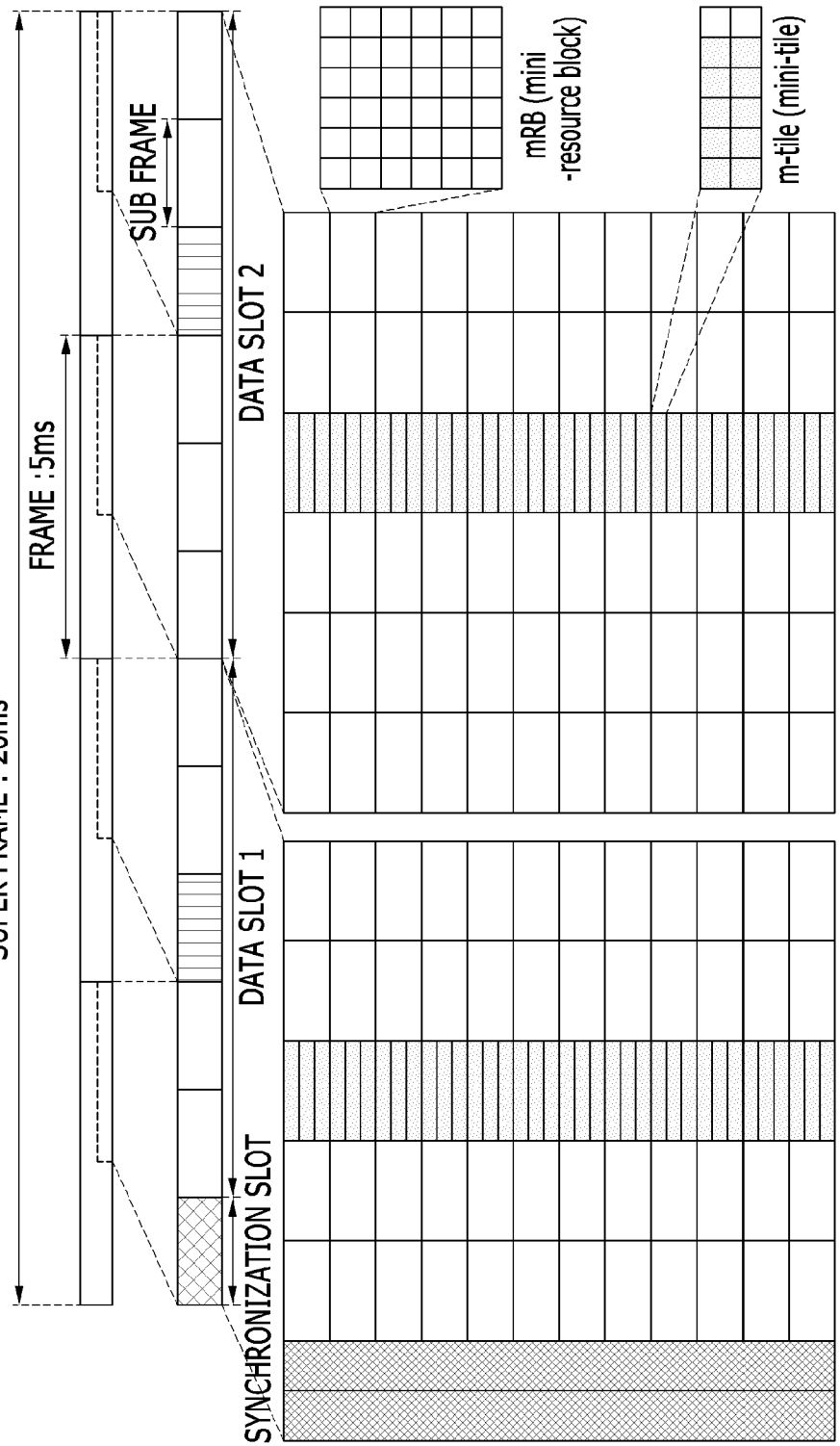
FIG. 2 is a diagram illustrating a frame structure for TDC according to an exemplary embodiment of the present invention.

FIG. 2 is a diagram illustrating a TDC frame structure for the TDC according to an exemplary embodiment of the present invention.

Referring to FIG. 2, a TDC frame for the TDC includes a synchronization slot and two data slots in a superframe. The synchronization slot may include a message part of the synchronization channel, a preamble part of the synchronization channel. And the data slots may include a data only channel which includes a plurality of mini-resource blocks (mRBs), and a data auxiliary channel which includes a plurality of mini-tiles (m-tiles).

Figure 3:
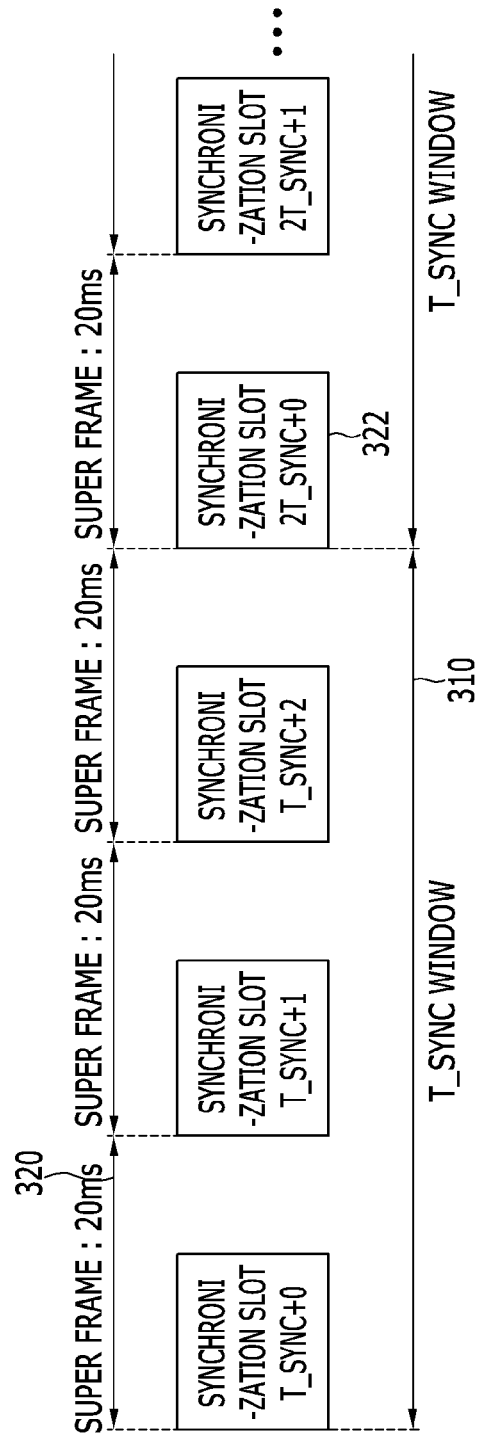
FIG. 3 is a diagram illustrating a synchronization signal transmitted at a predetermined interval according to an exemplary embodiment of the present invention.

FIG. 3 is a diagram illustrating a synchronization signal transmitted at a predetermined interval according to an exemplary embodiment of the present invention.

The TDC terminal in accordance with an exemplary embodiment of the present invention receives a plurality of synchronization signals in synchronization slots, and determines one of the plurality of synchronization signals as a reference synchronization signal. Then, upon receiving a synchronization signal which has a higher priority than the determined reference synchronization signal, the TDC terminal changes the reference synchronization signal to the newly received synchronization signal which has higher priority.

The TDC terminal then propagates a synchronization signal according to the aforementioned determination and transmission scenarios of transmission synchronization. In accordance with an exemplary embodiment of the present invention, the TDC terminal firstly selects one of synchronization slots which are vacant, and propagates a synchronization signal through the selected synchronization slot every predetermined interval (T_sync). The TDC terminal may randomly select the vacant synchronization slot. The predetermined interval may be presented by a TDC frame.

A T_sync window may include a plurality of super frames. Referring to FIG. 3, a T_sync window includes three superframes, that is, the predetermined interval is three superframes long. The synchronization signal may be transmitted in a synchronization slot 321 or 322 included in a superframe.

Figure 4:
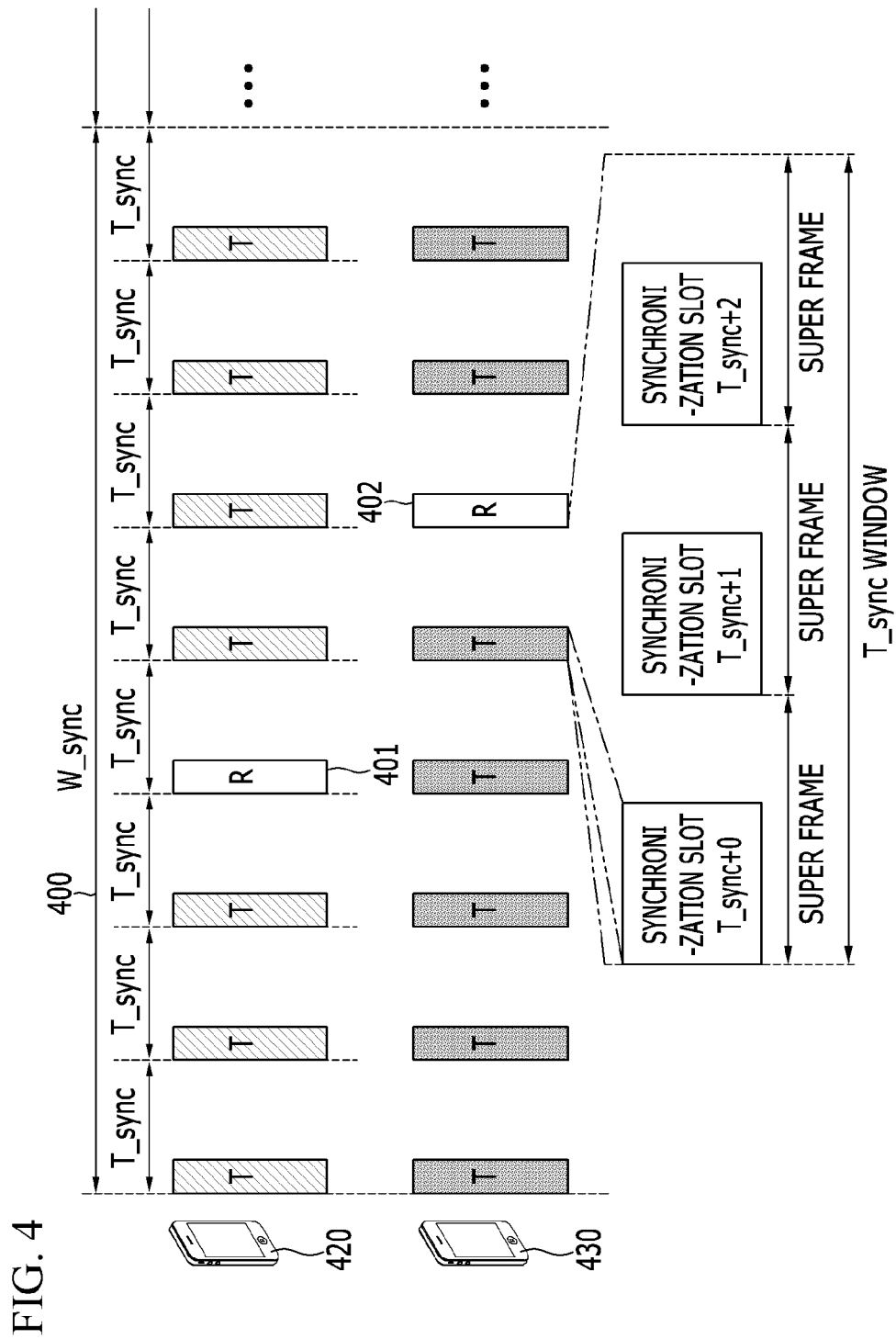
FIG. 4 is a diagram illustrating a frame structure of the TDC network and a synchronization signal according to an exemplary embodiment of the present invention.

FIG. 4 is a diagram illustrating a frame structure of the TDC network and a synchronization signal according to an exemplary embodiment of the present invention.

Conventionally, the TDC terminal receives all synchronization signals in synchronization slots included every TDC frame, and synchronizes a frame according to one of the synchronization scenarios. In this case, the TDC terminal only transmits the synchronization signal in the synchronization slot included every TDC frame, so the collision problem between synchronization signals cannot be solved.

Referring to FIG. 4, a W_sync window 400 includes a plurality of T_sync windows 410. In accordance with an exemplary embodiment of the present invention, the terminals 420 and 430 randomly select one of T_sync windows 410 included in the W_sync window 400, and then determine the selected T_sync window as a synchronization reception window. The terminals 420 and 430 check a collision between synchronization signals by detecting synchronization signal from another terminal in synchronization slots 401 and 402 of the determined T_sync window. That is, the terminals 420 and 430 do not transmit synchronization signals but receive them in the determined T_sync window. The terminals 420 and 430 may know the collision between synchronization signals upon receiving a synchronization signal in the determined T=sync window.

If the terminal determines a last T_sync window among a plurality of T_sync windows included in a W_sync window 400 as a synchronization reception window, the terminal may not select a first T_sync window in the W_sync window to prevent the T_sync window from being successively selected.

A TDC terminal may determine whether multiple synchronization signals collide in the following manner. First, if no signal is detected in a corresponding synchronization slot (or reception intensity of a signal is lower than a critical level of intensity), the TDC terminal may recognize that the multiple synchronization signals do not collide. Otherwise, if some signals are detected in the corresponding synchronization slot (or the reception intensity of a signal is higher than the critical level of intensity), the TDC terminal may recognize that collision between synchronization signals occurs in the slot.

In this case, when some synchronization signals are detected in the corresponding synchronization slot, the TDC terminal 1) may completely decode a preamble and data of the synchronization signals, 2) may decode the preamble of the synchronization signals excluding the data of the synchronization signals, or 3) cannot decode the synchronization signals.

Figure 5:
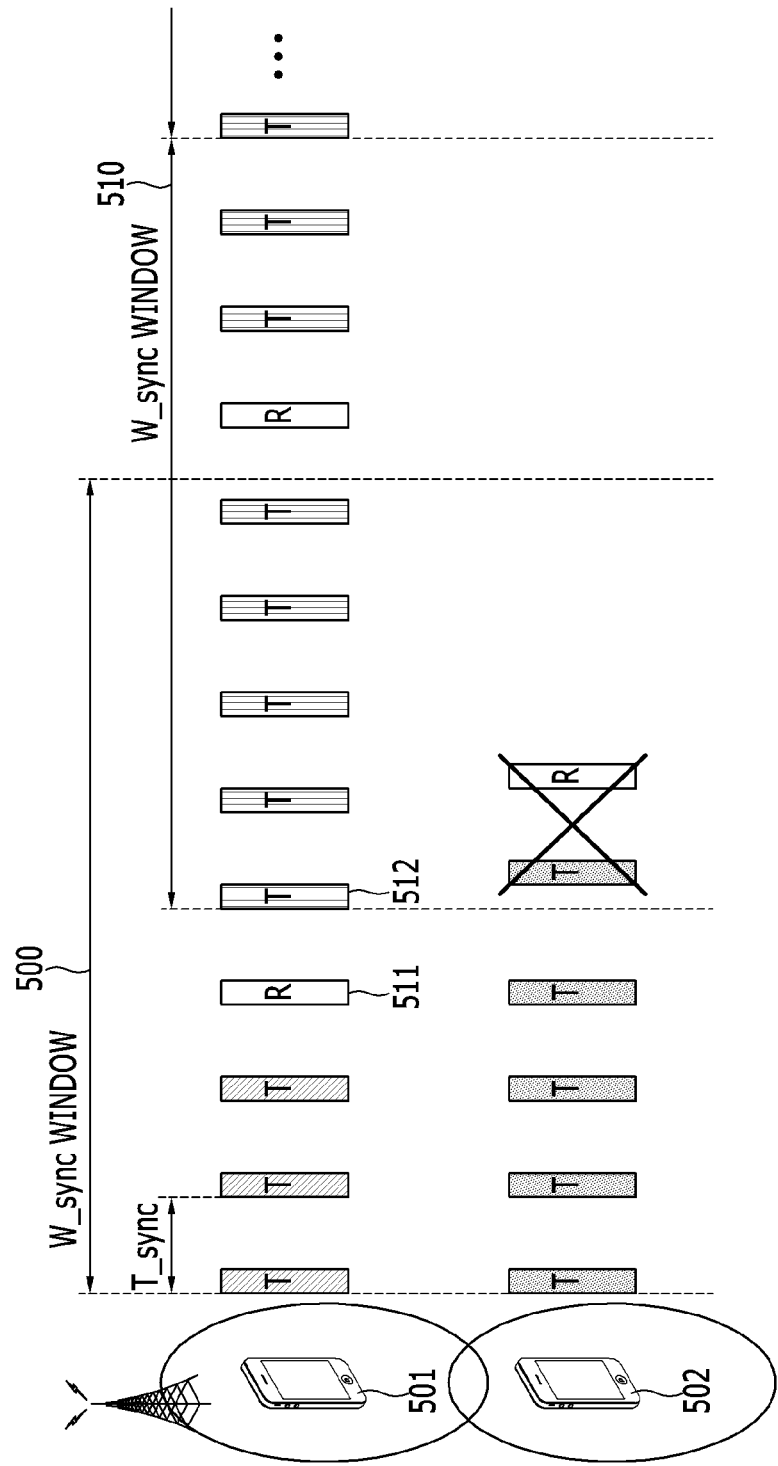
FIG. 5 and FIG. 6 are diagrams illustrating a collision between synchronization signals when the preamble and the data of the received signal are completely decoded according to an exemplary embodiment of the present invention.
Figure 6:
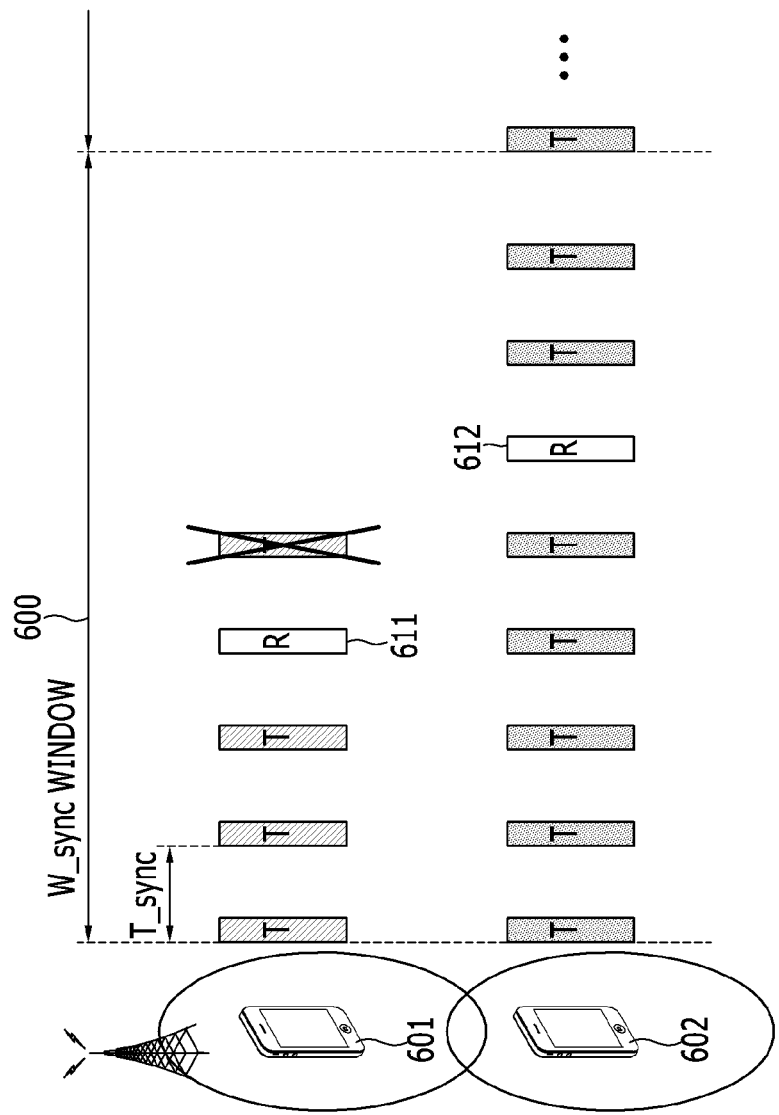

FIG. 5 and FIG. 6 are diagrams illustrating a collision between synchronization signals when the preamble and the data of the received signal are completely decoded according to an exemplary embodiment of the present invention.

Referring to FIG. 5 and FIG. 6, a terminal A 501 and a terminal B 502 transmit the synchronization signals to each other. The "T" marked in each slots is an abbreviation of "Transmission". The terminal A 501 and the terminal B 502 randomly select one of the T_sync windows included in a W_sync window 500, and then determine the selected T_sync window as a synchronization reception window. The terminal A 501 and the terminal B 502 then receive synchronization signals from other terminals through a synchronization slot included synchronization reception window.

The terminal A 501 receives synchronization signals from other terminals through the synchronization slot 511 marked as "R", and then decodes the preamble and data of the received synchronization signal. The "R" is an abbreviation of "Reception". The terminal A 501 may know a type of synchronization signal, a number of hops, and priority information from the decoded data.

FIG. 5 illustrates a case that the terminal A 501 is determined as a terminal which is allowed to continuously transmit the synchronization signal (hereinafter referred to as a "continuously transmitting terminal"). The terminal A 501 may recognize whether the terminal A 501 can continuously transmit the synchronization signals from the priority information. That is, the continuously transmitting terminal is a terminal that can continuously transmit the synchronization signals after the collision is detected.

Referring to FIG. 5, the terminal A 501 detects the collision between synchronization signals in the fourth synchronization slot 511. Then, the terminal A 501 randomly selects another synchronization slot 512 different from the slot in which synchronization signal is presently transmitted, and then transmits the synchronization signal through the selected synchronization slot 512. Accordingly, a W_sync window 510 is newly configured.

In accordance with an exemplary embodiment of the present invention, all terminals included in the TDC network receive synchronization signals from other terminals excluding at a slot transmitting a synchronization signal. Therefore, after receiving the synchronization signal transmitted from the terminal A 501 through the other synchronization slot 512, the terminal B 502 may recognize that the terminal B 502 is not the continuously transmitting terminal by identifying the priority information included in the decoded data of the synchronization signal. The terminal B 502 then stops transmitting the synchronization signal.

FIG. 6 illustrates a case that the terminal A 501 is determined as a terminal which is not allowed to continuously transmit the synchronization signals. The terminal A 601 receives a synchronization signal through the fourth synchronization slot, and decodes the received synchronization signal. Then, the terminal A 601 may recognize that it cannot continuously transmit the synchronization signal by checking the priority information of the decoded data. Accordingly, the terminal A 601 does not transmit the synchronization signal after detecting the collision between synchronization signals. However, the terminal B 602 continuously transmits synchronization signals because the collision between synchronization signals is not detected in the sixth synchronization slot 612.

Figure 7:
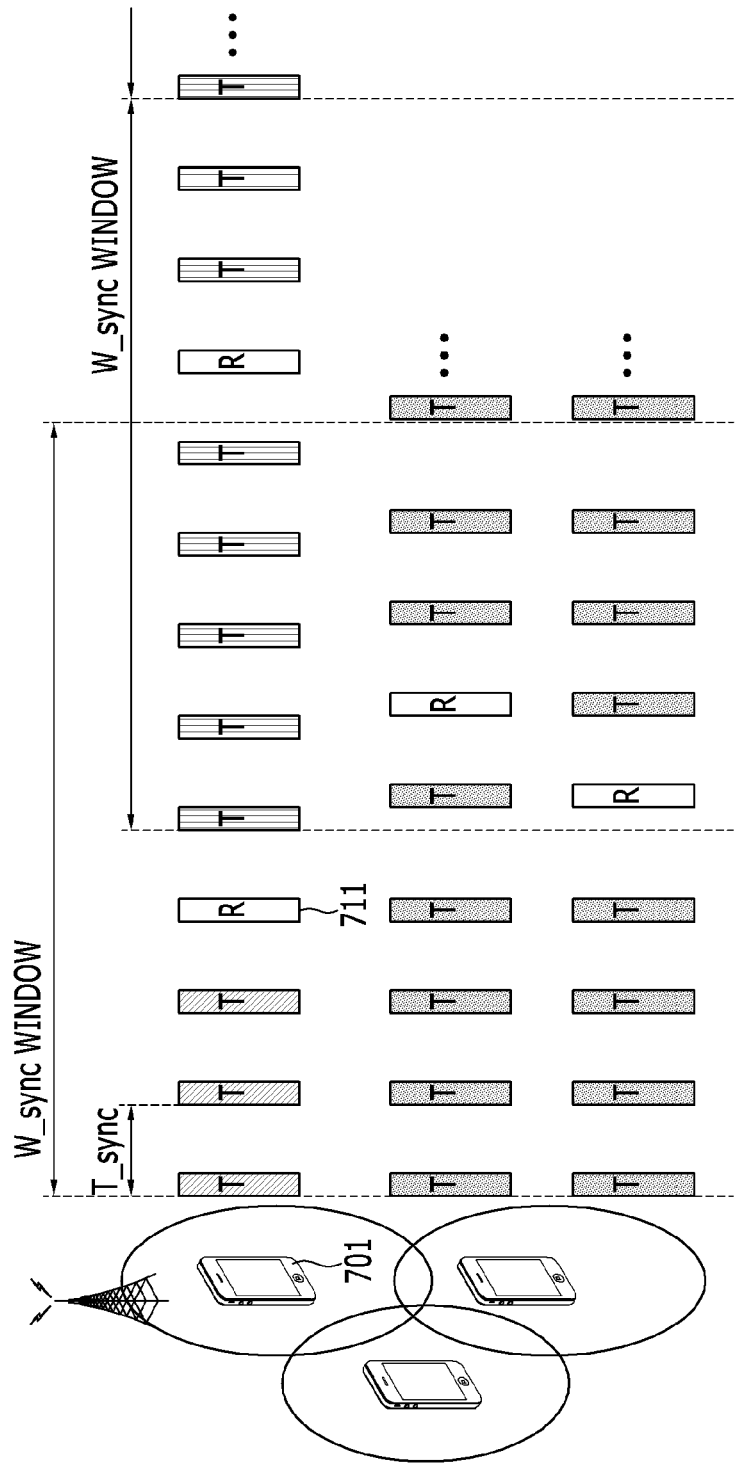
FIG. 7 is a diagram illustrating a collision between synchronization signals when the data of the received signal is not decoded but the preamble of the received signal is completely decoded according to an exemplary embodiment of the present invention.

FIG. 7 is a diagram illustrating a collision between synchronization signals when the data of the received signal is not decoded but the preamble of the received signal is completely decoded according to an exemplary embodiment of the present invention.

The terminal A 701 cannot decode the data of the received synchronization signal but successfully decodes the preamble of the synchronization signal. Due to not knowing the priority information, the terminal A 701 cannot determine whether it is a continuously transmitting terminal or not, so the terminal A 701 changes the synchronization slot to transmit the synchronization signal in the same manner of FIG. 5.

Figure 8:
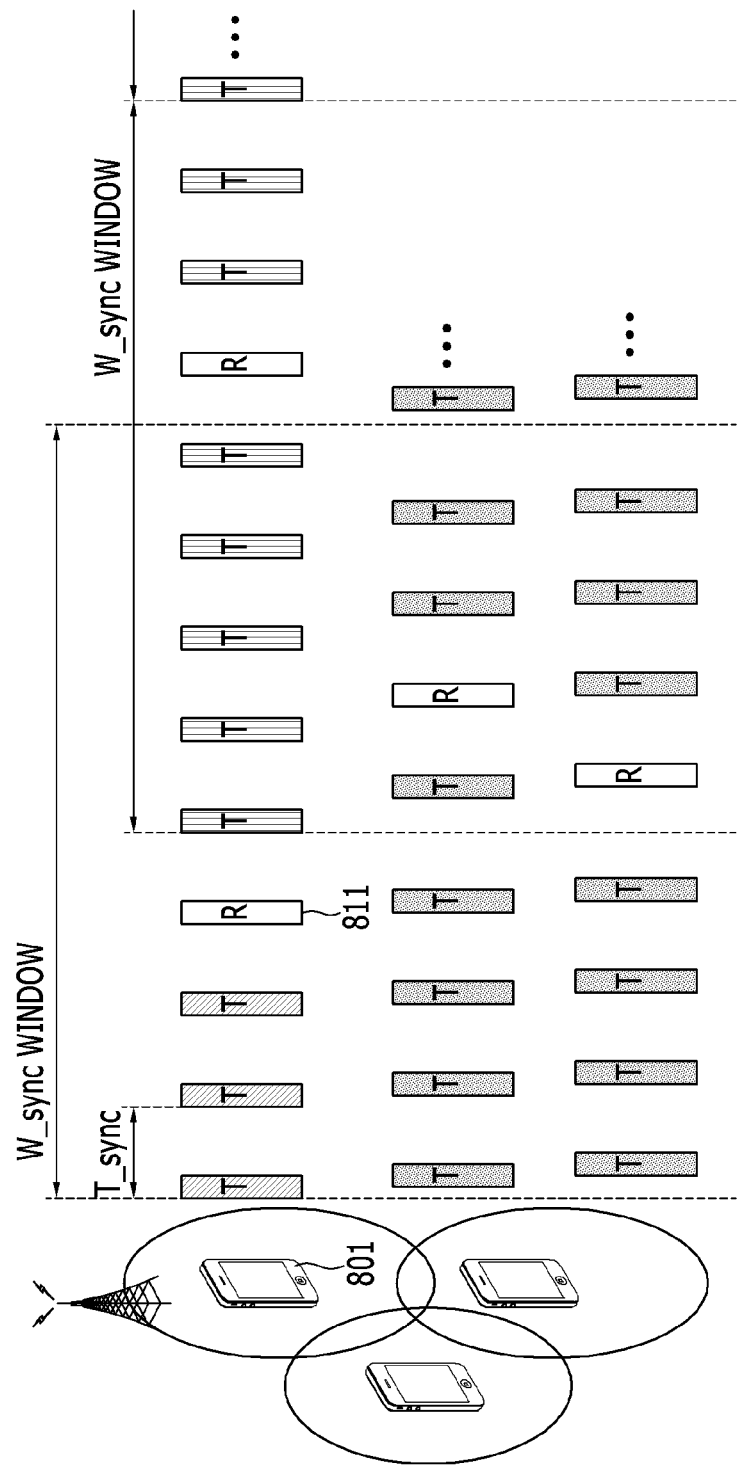
FIG. 8 is a diagram illustrating a collision between synchronization signals when the preamble and the data of the received signal are not decoded according to an exemplary embodiment of the present invention.

FIG. 8 is a diagram illustrating a collision between synchronization signals when the preamble and the data of the received signal are not decoded according to an exemplary embodiment of the present invention.

Referring to FIG. 8, due to not being able to decode the preamble of the received synchronization signal, the frame synchronization of each terminal is somewhat different. Although it receives the synchronization signal through the fourth synchronization slot 811, the terminal A 801 does not decode the preamble and the data of the received synchronization signal. Accordingly, the terminal A 801 changes the synchronization slot to transmit the synchronization signal in the same manner of FIG. 5.

Figure 9:
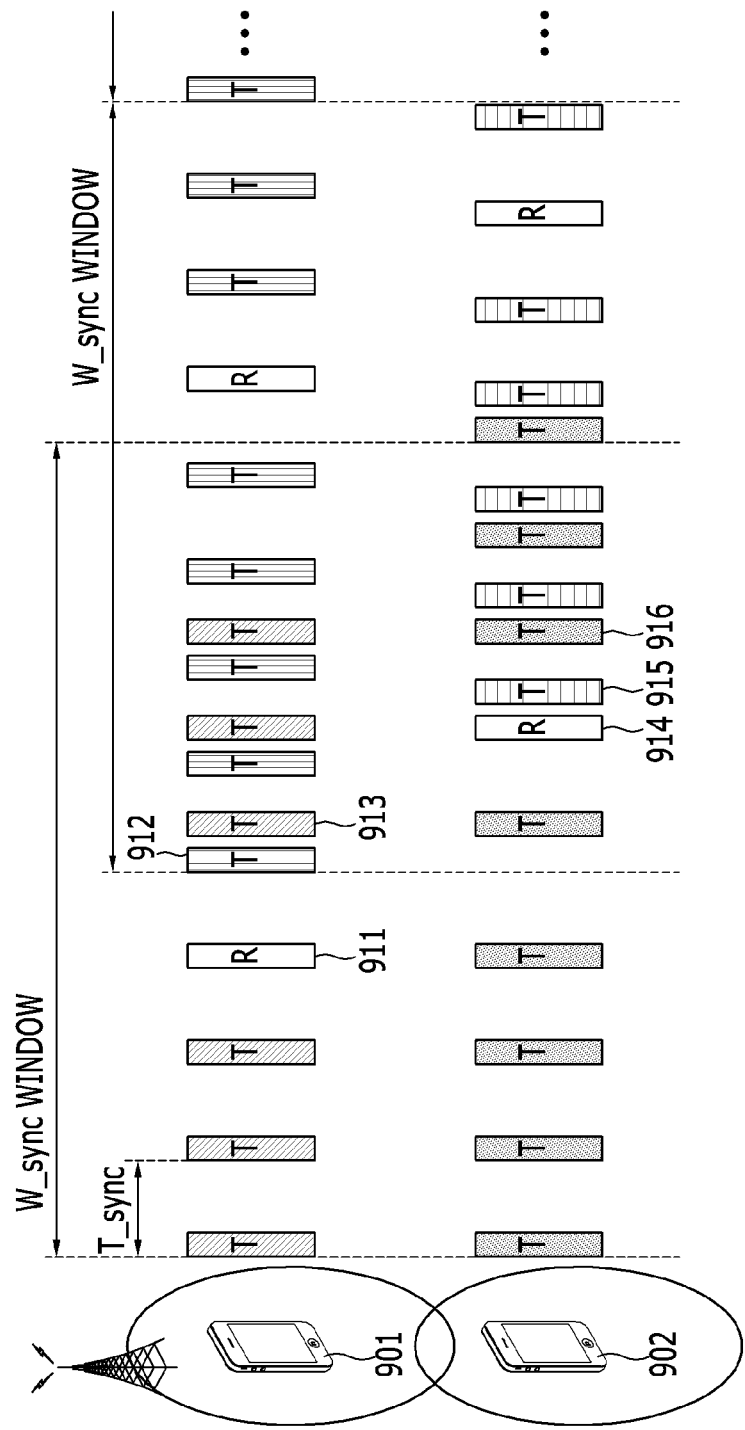
FIG. 9 to FIG. 11 are diagrams illustrating a collision between synchronization signals when the preamble and the data of the received signal are completely decoded according to another exemplary embodiment of the present invention.
Figure 10:
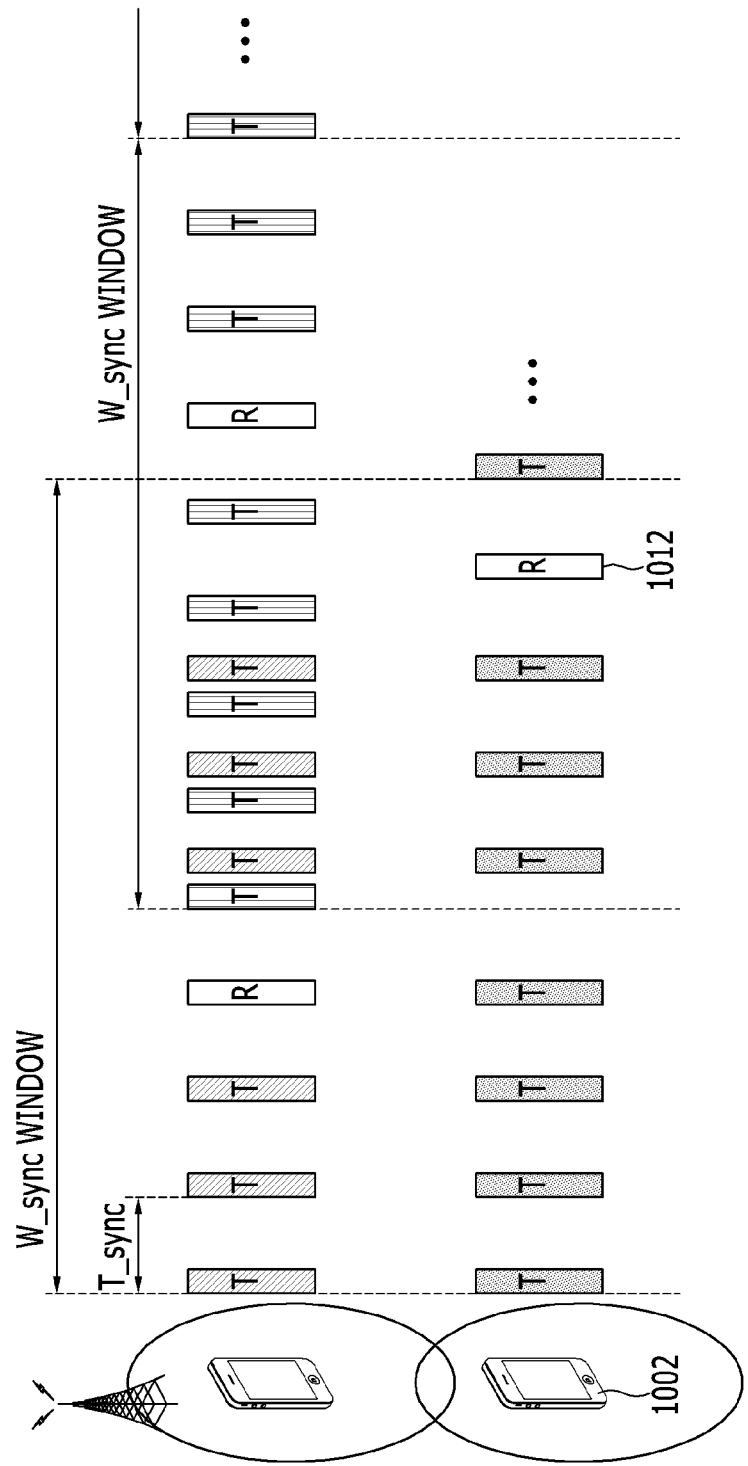
Figure 11:
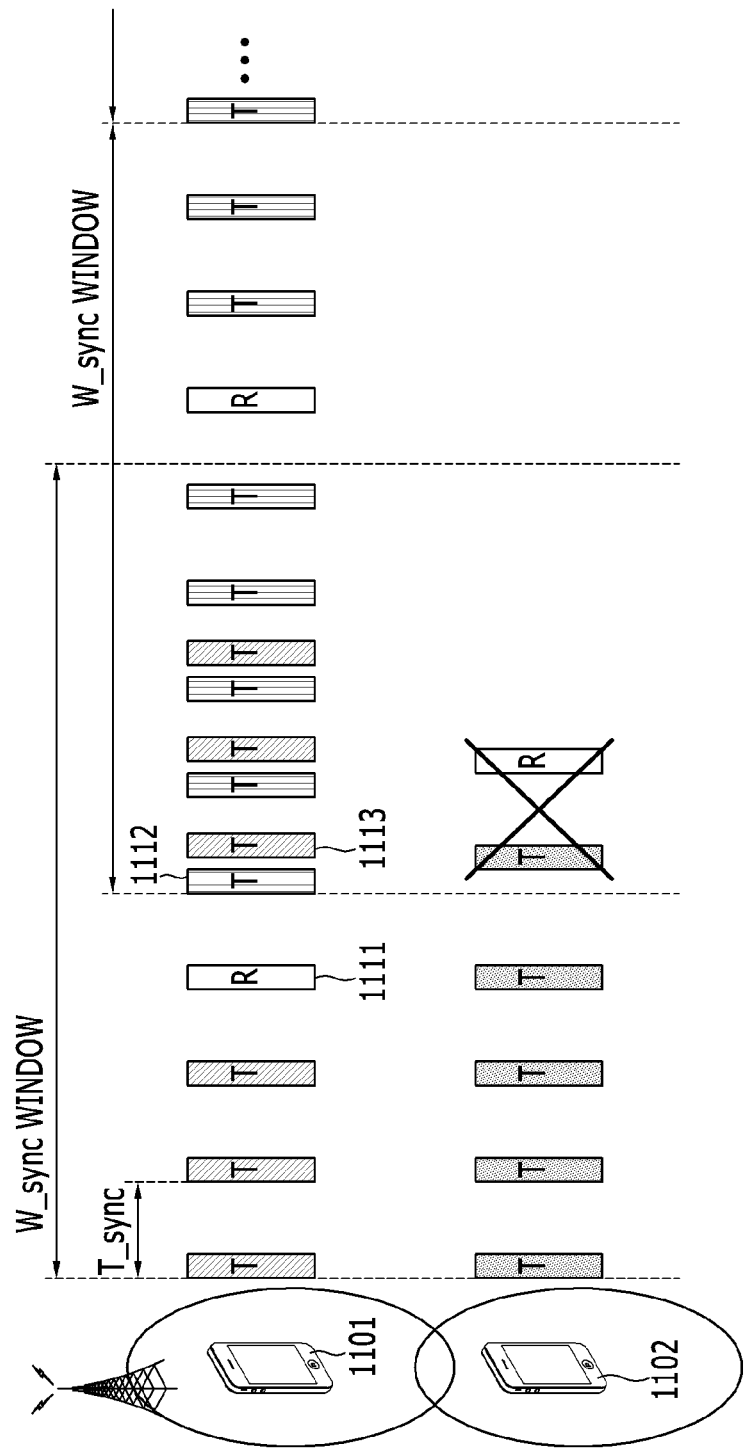

FIG. 9 to FIG. 11 are diagrams illustrating a collision between synchronization signals when the preamble and the data of the received signal are completely decoded according to another exemplary embodiment of the present invention.

FIG. 9 illustrates a case that the terminal A 901 and terminal B 902 are determined as continuously transmitting terminals. Each terminal can recognize whether it is a continuously transmitting terminal or not, by identifying priority information included in decoded data of the synchronization signal.

Referring to FIG. 9, the terminal A 901 detects the collision between synchronization signals in the fourth synchronization slot (911), and changes the synchronization slot to transmit the synchronization signal in the manner of FIG. 5. If there is no vacant synchronization slot, the terminal A 901 stops transmitting synchronization signals. The terminal A 901 transmits the synchronization signal a predetermined number of times more through the original synchronization slot. In accordance with an exemplary embodiment of the present invention, each terminal transmits the synchronization signal three times more through the original synchronization slot after detecting the collision between synchronization signals.

In accordance with another exemplary embodiment of the present invention, the terminal A 901 transmits the synchronization signal a predetermined number of times more through the original synchronization slot after detecting the collision, and then the terminal B 902 can recognize that there has been a collision between synchronization signals.

Then, the terminal B 902 may detect the collision in the sixth synchronization slot, and then change the synchronization slot to another one to transmit the synchronization signal. The terminal B 902 also transmits the synchronization signals three times or more through the original synchronization slot.

Referring to FIG. 10, when not being able to detect a collision between synchronization signals, the terminal B 1002 continuously transmits the synchronization signals through the original synchronization slot.

FIG. 11 illustrates a case that the terminal A 901 is determined as a continuously transmitting terminal but the terminal B 902 is not a continuously transmitting terminal.

Referring to FIG. 11, the terminal A 1101 detects a collision between synchronization signals in the fourth synchronization slot 1111, and then selects another synchronization slot 1112 to transmit the synchronization signal in the same manner of FIG. 5. In accordance with another exemplary embodiment of the present invention, all terminals included in the TDC network receive synchronization signals from other terminals excluding at a slot transmitting a synchronization signal. Therefore, after receiving the synchronization signal transmitted from the terminal A 1101 through the other synchronization slot 1112, the terminal B 1102 may recognize that the terminal B 502 is not a continuously transmitting terminal by identifying the priority information included in the decoded data of the synchronization signal. The terminal B 1102 then stops transmitting the synchronization signal.

Figure 12:
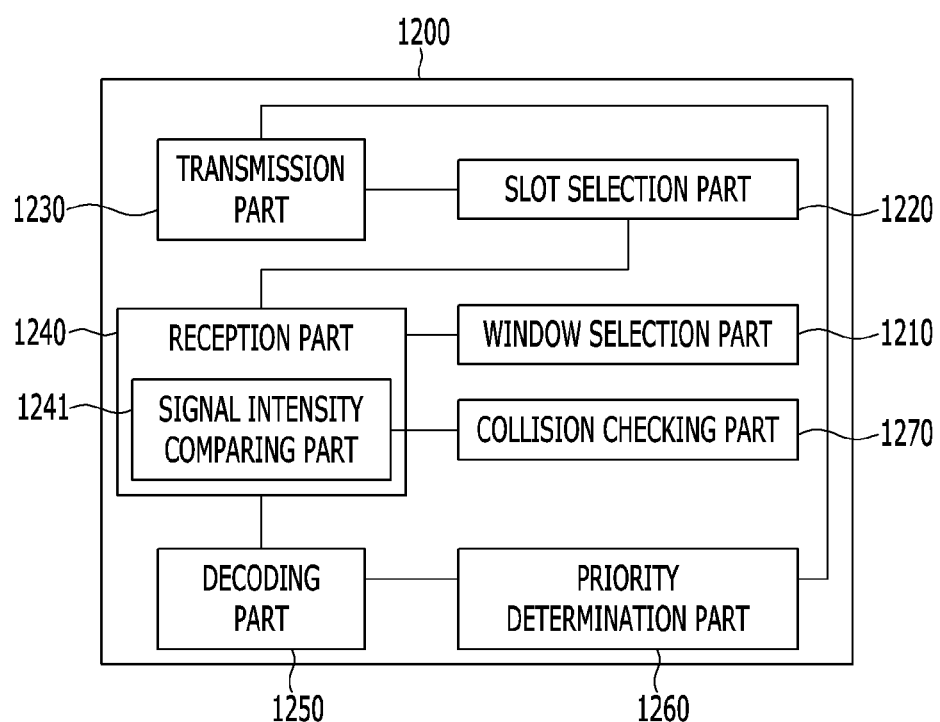
FIG. 12 is a diagram illustrating a TDC terminal according to an exemplary embodiment of the present invention.

FIG. 12 is a diagram illustrating a TDC terminal according to an exemplary embodiment of the present invention.

Referring to FIG. 12, according to an exemplary embodiment of the present invention, a terminal 1200 which transmits synchronization signals may include a window selection part 1210, a slot selection part 1220, a transmission part 1230, a reception part 1240, a decoding part 1250, a priority determination part 1260, and a collision checking part 1270.

The window selection part 1210 may randomly select one of a plurality of T_sync windows included in a W_sync window as a synchronization reception window.

The slot selection part 1220 may select one of a plurality of synchronization slots included in the T_sync window. That is, the slot selection part 1220 may select the synchronization slot from which the synchronization signal is transmitted in the T_sync window, when the terminal 1200 is the continuously transmitting terminal.

The transmission part 1230 may transmit synchronization signals through at least one synchronization slot included in the synchronization reception window. In accordance with another exemplary embodiment of the present invention, the transmission part 1230 is able to transmit synchronization signals a predetermined number of times more through the original synchronization slot.

The reception part 1240 may receive synchronization signals from other terminals through at least one synchronization slot included in the synchronization reception window. Actually, synchronization signals may or may not be received through the synchronization slot. The reception part 1240 may include a signal intensity comparing part 1241 that compares reception intensity of the received signal to the critical intensity, and notifies the collision checking part 1270 of the comparison result.

The decoding part 1250 may decode the preamble and data included in the synchronization signals received by the reception part 1240 from other terminals. The terminal 1200 can recognize whether it is continuously transmitting terminal or not according to the decoding result. That is, the priority information revealed upon completely decoding the preamble and data of the synchronization signals determines whether the terminal 1200 is the continuously transmitting terminal or not.

The priority determination part 1260 may determine whether it is a continuously transmitting terminal according to the priority information of the decoded synchronization signals. The terminal 1200 can transmit the synchronization signals only when it is a continuously transmitting terminal.

The collision checking part 1270 may check whether there has been a collision between synchronization signals based on the comparison result of the signal intensity comparing part 1241. That is, if the reception intensity of the signal is lower than a critical intensity, the collision checking part 1270 may determine multiple plural synchronization signals do not collide. Otherwise, if the reception intensity of the signal is higher than the critical intensity, the collision checking part 1270 may determine that collision between synchronization signals has occurred in the slot.

As described above, in an exemplary embodiment of the present invention, each terminal included in a TDC network can transmit synchronization signals without collision between the synchronization signals by detecting the signals in a synchronization slot.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for transmitting a synchronization signal of a terminal in a direct communication network, the method comprising:

randomly selecting one of a plurality of synchronization slots included in a first window as a first synchronization slot;

transmitting a first synchronization signal through the plurality of synchronization slots excluding the first synchronization slot;

detecting a second synchronization signal transmitted from other terminals using the first synchronization slot; and determining that a collision from amongst the synchronization signals has occurred based on the detection result.

2. The method of claim 1, wherein the selecting comprises:

determining one of a plurality of second windows included in the first window as a synchronization reception window; and selecting one of a plurality of synchronization slots included in the second windows as the first synchronization slot.

3. The method of claim 2, wherein the second window comprises a plurality of superframes, and each superframe comprises a synchronization slot.

4. The method of claim 2, wherein the detecting comprises comparing intensity of the second synchronization signal to a predetermined critical intensity.

5. The method of claim 3, wherein the determining comprises:
  determining that the collision has not occurred when the intensity of the second synchronization signal is lower than the predetermined critical intensity; and
  determining that the collision has occurred when the intensity of the second synchronization signal is higher than the predetermined critical intensity.

6. The method of claim 2, further comprising:
  after the determining, decoding a preamble and data of the second synchronization signal; and
  determining whether the terminal is a continuously transmitting terminal or not, based on priority information included in the decoded data of the second synchronization signal.

7. The method of claim 6, further comprising:
  selecting one of a plurality of synchronization slots included in the second window as a second synchronization slot; and
  transmitting a third synchronization signal through the second synchronization slot included in the second windows, excluding the synchronization reception window.

8. The method of claim 7, wherein the transmitting the first synchronization signal comprising transmitting the first synchronization signal a predetermined number of times more through the first synchronization slot.

9. The method of claim 7, further comprising stopping transmitting the first synchronization signal when the terminal is not the continuously transmitting terminal.

10. An apparatus for transmitting a synchronization signal in a direct communication network, the apparatus comprising:
  a slot selector configured to select one of a plurality of synchronization slots included in a first window as a first synchronization slot;
  a transmitter configured to transmit a first synchronization signal through the plurality of synchronization slots excluding the first synchronization slot;
  a receiver configured to detect a second synchronization signal transmitted from other terminals using the first synchronization slot; and
  a collision checker configured to determine that a collision from amongst the synchronization signals has occurred based on the detection result.

11. The apparatus of claim 10, wherein the slot selector comprises:
  a window selector configured to determine one of a plurality of second windows included in the first window as a synchronization reception window; and
  selects one of a plurality of synchronization slots included in the second windows as the first synchronization slot.

12. The apparatus of claim 11, wherein the second window comprises a plurality of frames, and each frame comprises some of a plurality of synchronization slots.

13. The apparatus of claim 11, wherein the reception part comprises a signal intensity comparing part configured to compare intensity of the second synchronization signal to a predetermined critical intensity.

14. The apparatus of claim 13, wherein the collision checking part is configured to determine that the collision has not occurred when the intensity of the second synchronization signal is lower than the predetermined critical intensity; and to determine that the collision has occurred when the intensity of the second synchronization signal is higher than the predetermined critical intensity.

15. The apparatus of claim 11, further comprising:
  a decoding part configured to decode a preamble and data of the second synchronization signal; and
  a priority determination part configured to determine whether the terminal is a continuously transmitting terminal or not, based on priority information included in the decoded data of the second synchronization signal.

16. The apparatus of claim 15, wherein the slot selection part is configured to select one of a plurality of synchronization slots included in the second window as a second synchronization slot, and wherein the transmitting part is configured to transmit a third synchronization signal through the second synchronization slot included in the second windows, excluding the synchronization reception window.

17. The apparatus of claim 16, wherein the transmitting part configured to transmit the first synchronization signal transmits the first synchronization signal a predetermined number of times more through the first synchronization slot.

18. The apparatus of claim 16, wherein the transmitting part is configured to stop transmitting the first synchronization signal when the terminal is not the continuously transmitting terminal.

* * * * *